Feb. 24, 1942.    J. ZAHRADNIK    2,274,180
TRACTION WHEEL
Filed April 8, 1939
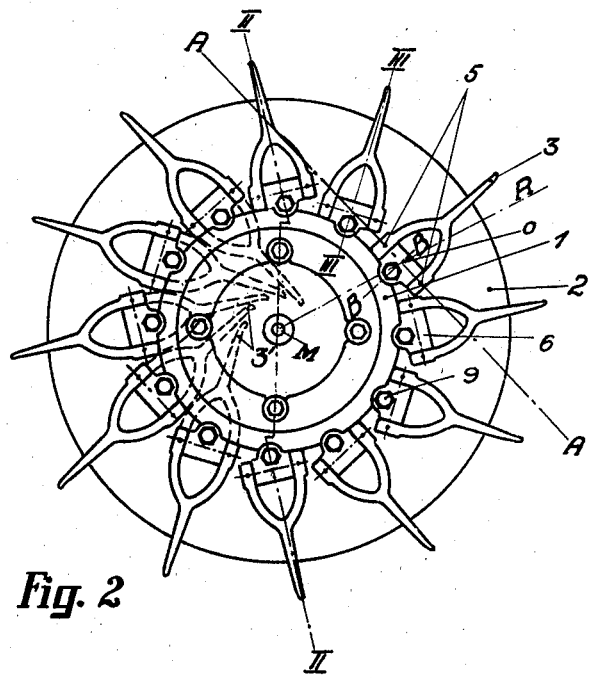
Inventor
JOSEF ZAHRADNIK
By
Attorneys Patented Feb. 24, 1942

2,274,180

UNITED STATES PATENT OFFICE 2,274,180

TRACTION WHEEL

Josef Zahradnik, Stuttgart-Korntal, Germany, assignor to Dr. Ing. h. c. F. Porsche, K.-G., Stuttgart-Zuffenhausen, Germany, a company of Germany Application April 8, 1939, Serial No. 266,715
In Germany April 13, 1938

4 Claims. (Cl. 301—50)

This invention relates to improvements in traction wheels, and more particularly to traction cleats for such wheels.

An object of this invention is to provide a traction wheel with a plurality of readily movable traction cleats.

Another object of this invention is to provide a traction wheel with a plurality of low-weight, easily manufactured and easily replaced traction cleats.

A further object of this invention is to provide a traction wheel with a plurality of traction cleats which may be moved from their ground engaging to their retracted positions and vice versa with a minimum expense of time and effort.

A still further object of this invention is to provide a traction wheel with a plurality of traction cleats swingable in one motion from their engaging to their retracted positions and vice versa, and held in such positions by a simple, readily releasable means.

An additional object of this invention is to provide a traction wheel with a plurality of traction cleats which in their retracted position do not interfere with the removal of the wheel.

With the foregoing and other objects in view which will appear as the description proceeds, the invention resides in the combination and arrangement of parts, and in the details of the construction hereinafter described and claimed.

The invention has been illustrated in its preferred embodiment in the accompanying drawing, wherein:

Fig. 1 is a side view of a traction wheel containing my improved construction;

Fig. 2 is a central cross-sectional view of the same, taken along the line II—II of Fig. 1; and Fig. 3 is a cross-sectional view along the line III—III of Fig. 1, drawn to a larger scale and illustrating a detail of my construction.

In Figs. 1 and 2 a traction or driving vehicle wheel has generally been indicated by the reference numeral 1. Except for the improvement hereinafter described the wheel 1 may be formed in any manner now common to the art, and it is adapted to carry suitable ground engaging means such as a tire 2.

It is often desirable that the driving wheels of a vehicle, particularly those of tractors, trucks, and the like be provided with supplementary members, such as traction cleats or grippers for increasing the traction effort. The present invention is concerned with a novel method of applying such traction cleats to the ordinary wheel. In the drawing the traction cleats are indicated by the reference numeral 3 in the position in which they extend about the tire 2. To indicate their retracted position the reference numeral 3' has been applied.

The traction cleats 3 are preferably formed with one end bent so as to generally extend about the bottom and one side of the tire, when in their position of use. The other ends of the cleats 3 are preferably shaped as a two-arm fork to which a pivot pin 4 is connected against rotation by suitable means such as a pin or key 5. The pin 4 is journaled in a split bearing 6 forming part of or mounted upon the wheel 1. The traction cleats are accordingly swingable about the pivot pin 4 from their engaging to their retracted position, or vice versa.

Attention is directed to the fact that the pivot axis A—A of the pivot pin 4 extends at an oblique angle to the radius R leading from the center point M of the wheels through the center of the bearing 6. The axis of each pivot pin is similarly related to its respective radius and all of these axes will lie in a plane substantially parallel to the central vertical plane of the wheel. These axes, if extended would form a regular polygon, in this case of 12 sides. This construction is extremely advantageous in that it permits a spiral arrangement of the cleats 3 in their retracted position 3', without interfering with one another and still permitting access to the wheel hub. In contrast to known arrangements, this allows a ready removal of the wheel, despite the presence of the traction cleats in their retracted position.

While any suitable means may be used for holding the traction cleats in their end positions, I prefer to use the simple improved construction more clearly illustrated in Fig. 3. As there shown, a collar 7 and a nut 8 are mounted upon opposite sides of the pivot pin 4, while a bolt 9 passing through the collar 7 and threadably engaged with the nut 8 is adapted to exert a clamping action when tightened upon the pivot pin 4 along the clamping surfaces 10, 11. The collar 7 and its nut 8 are preferably mounted in a guide 12 formed in the bearing 6, which lies in a plane B—B substantially at right angles to the axis A—A of the turning pivot 4.

As will be clearly evidenced, one of the advantages of the present construction lies in its simplicity of operation and adjustment. Assuming that all of the traction cleats are in their engaging or tire covering positions, as shown in solid lines in Figs. 1 and 2, if it is desired to retract the cleats all that is necessary to be done is to loosen the bolts 9 and swing the cleats into place. When in their retracted position the bolts will again be tightened and the cleats will then be held firmly in the position 3'. As previously stated, in the retracted position the traction cleats are positioned in such a position to one another in such a manner that they still permit access to the wheel hub for removal of the wheel, etc., and the cleats will also lie substantially within the lateral boundaries of the wheel.

When the cleats are to be moved from their retracted to their engaging position the reverse method will, of course be followed out.

In addition to the advantages of this construction as set forth above, attention is further directed to the fact that by positioning the pivot axes of the grippers at an angle to the corresponding wheel radius, it is possible to use relatively longer cleats than if such axes were perpendicular to the radii. The possibility of using longer cleats permits greater flexibility in the relative designing and positioning of the parts.

The clamping arrangement which has been proposed is also of advantage due to its extreme simplicity. The parts can readily be cleaned and replaced when desired, while at the same time they form a clamp which holds the cleats in place under conditions of the heaviest loads and roughest usage. The structure shown and described is both simple in operation and economical of manufacture.

A further advantage of the described construction lies in the fact that it is mechanically simple and thus more or less unaffected in its operation by dirt and grease. If the parts do become dirty they are readily diassembled for cleaning and just as easily reassembled.

While I have described my improved construction in more or less detail to comply wtih the requirements of the statute, it is nevertheless desired that this detailed description be considered merely as illustrative and not as limiting, and it is to be understood that changes and modifications in the construction may be made by those skilled in this art without departing from the invention as defined in the following claims.

I claim:

1. A traction wheel, ground engaging means mounted on said wheel, a split journal attached to said wheel, the axis of which extends at an oblique angle to the radius of the wheel extending through the center of the journal, a traction cleat having a member connected thereto for rotation in said journal, whereby said traction cleat may be swung to engaging and disengaging position with said ground engaging means, and mean for clamping said split journal to hold said traction cleat in its engaging and disengaging positions.

2. The combination according to claim 1, in which said last means comprises a nut adapted to press against one side of said rotatable member, a collar adapted to press against the other side of said rotatable member, and a bolt passing through said collar and having threads engaging said nut, whereby said bolt may be tightened or loosened to prevent or permit rotation of said member and traction cleat.

3. The combination according to claim 1, in which said split journal is formed with a hollow guide, and said last means comprising a nut mounted in said guide and adapted to press against one side of said rotatable member, a collar mounted in said guide and adapted to press against the other side of said rotatable member, and a bolt passing through said collar and having threads engaging said nut, whereby said bolt may be tightened or loosened to prevent or permit rotation of said member and traction cleat.

4. A traction wheel including, in combination, journaling means mounted on said wheel, the axis of which extends at an oblique angle to the radius of the wheel, a traction cleat formed with a forked arm at one end thereof, a pivot pin rotatable in said journaling means, means interconnecting the opposite ends of said pivot pin with the respective arms of said forks, whereby said traction cleat is pivotally movable between the retracted and ground-engaging positions, and means for rigidly clamping said pivot pin to hold said traction cleat in either its retracted or ground-engaging position.

JOSEF ZAHRADNIK.